United States Patent
Xiao (10) Patent No.: US 10,904,300 B2
(45) Date of Patent: Jan. 26, 2021

(54) METHOD AND DEVICE FOR MANAGING USER INFORMATION

(71) Applicant: Alcatel Lucent, Nozay (FR)

(72) Inventor: Yu Xiao, Shanghai (CN)

(73) Assignee: Alcaltel Lucent, Nozay (FR)

( * ) Notice: Subject to any disclaimer, the term of this patent is extended or adjusted under 35 U.S.C. 154(b) by 0 days.

(21) Appl. No.: 16/471,818

(22) PCT Filed: Dec. 20, 2017

(86) PCT No.: PCT/IB2017/001697
§ 371 (c)(1),
(2) Date: Jun. 20, 2019

(87) PCT Pub. No.: WO2018/115969
PCT Pub. Date: Jun. 28, 2018

(65) Prior Publication Data
US 2020/0120148 A1 Apr. 16, 2020

(30) Foreign Application Priority Data
Dec. 22, 2016 (CN) .......................... 2016 1 1195273

(51) Int. Cl.
*H04L 29/06* (2006.01)
*H04L 12/26* (2006.01)

(52) U.S. Cl.
CPC .......... *H04L 65/1073* (2013.01); *H04L 43/10* (2013.01); *H04L 65/102* (2013.01); *H04L 65/1006* (2013.01); *H04L 65/80* (2013.01)

(58) Field of Classification Search
CPC ............... H04L 65/1006; H04L 65/105; H04L 65/1069; H04L 65/1046; H04L 65/1073;
(Continued)

(56) References Cited

U.S. PATENT DOCUMENTS 6,763,385 B1 * 7/2004 Orfali .................. G06F 11/348
709/224
9,330,018 B2 * 5/2016 Deutschle ........... G06F 12/1027
(Continued)

FOREIGN PATENT DOCUMENTS

CN          101616069 A     12/2009
CN          102027716 A     4/2011
(Continued)

OTHER PUBLICATIONS

International Search Report for PCT/IB2017/001697 dated Apr. 11, 2018.
(Continued)

*Primary Examiner* — Ninos Donabed
(74) *Attorney, Agent, or Firm* — Fay Sharpe LLP (57) ABSTRACT

Embodiments of the present disclosure relate to a method for managing user information in a SIP network and a device thereof. The method comprises: initiating a restart timer after a SIP access gateway restarts; within an expiration period of the restart timer, sending a heartbeat reply message to the network element in response to a heartbeat message from a network element, the reply message including the time when the SIP access gateway restarts. If a difference between the time when the SIP access gateway restarts and a current time is less than a time interval between heartbeat messages, the network element sends a registration request to the SIP access gateway, where the registration request includes user information of all users represented by the network element. It is further disclosed a device implementing the method discussed above.

20 Claims, 4 Drawing Sheets

(58) Field of Classification Search
CPC ............... H04L 65/80; H04L 67/1002; H04L 29/06027; H04L 67/14; H04L 69/40; H04L 61/106; H04M 15/63
See application file for complete search history.

(56) References Cited

U.S. PATENT DOCUMENTS

| | | | | |
|---|---|---|---|---|
| 10,601,880 | B2* | 3/2020 | Phadnis | H04L 65/1083 |
| 2006/0115058 | A1* | 6/2006 | Alexander | H04N 21/4147 379/90.01 |
| 2006/0115062 | A1* | 6/2006 | Gonder | H04M 15/06 379/142.01 |
| 2006/0265376 | A1* | 11/2006 | Tagane | H04L 12/1403 |
| 2007/0160058 | A1 | 7/2007 | Zhou et al. | |
| 2007/0266162 | A1* | 11/2007 | Dutta | H04L 67/14 709/228 |
| 2007/0297598 | A1* | 12/2007 | Kaneko | H04M 3/20 379/372 |
| 2008/0144605 | A1 | 6/2008 | Qiu et al. | |
| 2008/0205607 | A1* | 8/2008 | Tagane | H04L 65/1046 379/93.01 |
| 2009/0177785 | A1* | 7/2009 | Reid | H04L 61/00 709/228 |
| 2009/0219859 | A1* | 9/2009 | Fukushima | H04L 65/1046 370/328 |
| 2009/0232059 | A1* | 9/2009 | Sundberg | H04W 76/15 370/329 |
| 2009/0262642 | A1 | 10/2009 | van Greunen et al. | |
| 2010/0034194 | A1* | 2/2010 | Fieremans | A61P 31/04 370/352 |
| 2010/0082977 | A1* | 4/2010 | Boyle | H04L 63/0815 713/158 |
| 2011/0029812 | A1* | 2/2011 | Lu | H04L 65/1006 714/18 |
| 2012/0218989 | A1* | 8/2012 | Tanabe | H04L 12/66 370/352 |
| 2012/0259925 | A1* | 10/2012 | Braudes | H04L 51/16 709/206 |
| 2013/0054806 | A1* | 2/2013 | Francis | H04L 65/105 709/226 |
| 2013/0204962 | A1* | 8/2013 | Estevez | H04N 7/185 709/217 |
| 2014/0129798 | A1* | 5/2014 | Deutschle | G06F 12/1009 711/207 |
| 2014/0129800 | A1* | 5/2014 | Deutschle | G06F 12/1009 711/207 |
| 2014/0214972 | A1* | 7/2014 | Nemani | H04L 29/08594 709/206 |
| 2014/0254574 | A1* | 9/2014 | Schreuder | H04L 65/1006 370/338 |
| 2014/0258367 | A1* | 9/2014 | Suryavanshi | H04L 65/1073 709/203 |
| 2014/0258368 | A1* | 9/2014 | Suryavanshi | H04L 29/06047 709/203 |
| 2014/0376360 | A1 | 12/2014 | Lisak et al. | |
| 2016/0072957 | A1* | 3/2016 | Gordon | H04M 3/5183 379/202.01 |
| 2016/0277451 | A1* | 9/2016 | Han | H04L 12/66 |
| 2016/0344845 | A1* | 11/2016 | Shuman | H04L 67/42 |
| 2017/0041196 | A1 | 2/2017 | Fu | |
| 2017/0076250 | A1* | 3/2017 | Pommerening | G06K 7/1417 |
| 2019/0037618 | A1* | 1/2019 | Yang | H04L 45/74 |

FOREIGN PATENT DOCUMENTS

| | | |
|---|---|---|
| CN | 104980295 A | 10/2015 |
| CN | 105530117 A | 4/2016 |
| EP | 1 914 937 A1 | 4/2008 |

OTHER PUBLICATIONS

English Bibliography of Chinese Application Publication No. CN101616069A, Published on Dec. 30, 2009, Printed from Derwent Innovation on Aug. 12, 2020, 5 pages.

English Bibliography of Chinese Application Publication No. CN102027716A, Published on Apr. 20, 2011, Printed from Derwent Innovation on Aug. 12, 2020, 9 pages.

English Bibliography of Chinese Application Publication No. CN104980295A, Published on Oct. 14, 2015, Printed from Derwent Innovation on Aug. 12, 2020, 5 pages.

English Bibliography of Chinese Application Publication No. CN105530117A, Published on Apr. 27, 2016, Printed from Derwent Innovation on Aug. 12, 2020, 5 pages.

PCT Application No. PCT/IB2017/001697, "Written Opinion of the International Searching Authority", dated Apr. 11, 2018, 8 pages.

* cited by examiner

METHOD AND DEVICE FOR MANAGING USER INFORMATION

FIELD

Embodiments of the present disclosure generally relate to communication technologies, and more particularly, to a method and device for managing user information.

BACKGROUND

In some remote or scarcely populated areas, such as hamlets, islands and the like, there are generally only deployed SIP access gateways. These SIP access gateways communicate with SIP application servers which are deployed in towns or on the mainland and provide a voice service or a most value-added service for users within the coverage of these SIP access gateways. However, once the communication between the SIP access gateways and the SIP application server breaks down, for example due to the fiber line interruption caused by an earthquake, the users within the coverage of the SIP access gateways cannot communicate with each other, which means that the "local" communication within the SIP access gateways is also disconnected.

Lots of telecommunication customers intend to communicate with each other in these isolated areas in case that the communication between SIP access gateways and SIP application servers breaks down. Therefore, enhanced SIP access gateways appears, which can provide a basic one-to-one call service and forward SIP messages in a stateless way, which means that the enhanced SIP access gateways do not record states of calls. Such an enhanced SIP access gateway may employ its own simple call application processing function to provide the basic phone call service for terminal users, user agents and further non-enhanced access gateways within the local network. Once launched, the enhanced SIP access gateways are well received by the customers with an increasing number of deployments.

Since the enhanced SIP access gateways do not have high service requirements and larger deployments, the customers expect that the SIP access gateways may be easily implemented with a low cost. Therefore, the enhanced SIP access gateways do not configure user information in advance and obtain and save user information by registration learning, that is, user registration. However, after the SIP access gateways restart for some reasons, they loses all their user information. The restart occurs in a short period, while the time duration to trigger user re-registration is quite long (generally 1800~3600 seconds). Therefore, between the restart of the SIP access gateway and the completion of all user re-registration, many users will not receive calls due to loss of user information. As a result, the users within the coverage of the SIP access gateway cannot communicate normally.

Therefore, there is a need to provide a method for solving the problem of a communication failure due to the restart of the enhanced SIP access gateway.

SUMMARY

Generally, the embodiments of the present disclosure present a method and device for managing user information in a SIP network.

In a first aspect of the present disclosure, there is provided a method of managing user information in a SIP access gateway, where the method comprises: in response to the SIP access gateway restarting, initiating a restart timer; within an expiration period of the restart timer, sending a heartbeat reply message to a network element in response to a heartbeat message from the network element, the reply message including a time when the SIP access gateway restarts.

In some embodiments, the network element is a terminal user, a user agent or a further SIP access gateway.

In some embodiments, the heartbeat message is a REGISTER message or an OPTIONS message.

In a second aspect of the present disclosure, there is provided a method of managing user information in a network element of a SIP network. The method comprises: receiving from a SIP access gateway a heartbeat reply message, the heartbeat reply message includes the time when the SIP access gateway restarts; if a difference between the time when the SIP access gateway restarts and a current time is less than a time interval between heartbeat messages, sending to the SIP access gateway a registration request, where the registration request includes user information of a user represented by the network element.

In some embodiments, the network element is a terminal user, a user agent or a further SIP access gateway.

In some embodiments, the heartbeat message is a REGISTER message or an OPTIONS message.

In a third aspect of the present disclosure, there is provided an apparatus for managing user information in a SIP access gateway, where the apparatus comprises: timer initiating module configured to initiate a restart timer in response to the SIP access gateway restarting; first sending module configured to, within an expiration period of the restart timer, send a heartbeat reply message to a network element in response to a heartbeat message from the network element, the reply message including the time when the SIP access gateway restarts.

In some embodiments, the network element is a terminal user, a user agent or a further SIP access gateway.

In some embodiments, the heartbeat message is a REGISTER message or an OPTIONS message.

In a fourth aspect of the present disclosure, there is provided an apparatus for managing user information in a network element of a SIP network, where the apparatus comprises: receiving module configured to receive a heartbeat reply message from a SIP access gateway, where the heart replay message includes a time when the SIP access gateway restarts; second sending module configured to send a registration request to the SIP access gateway if a difference between the time when the SIP access gateway restarts and a current time is less than a time interval between heartbeat messages, where the registration request includes user information of a user represented by the network element.

In some embodiments, the network element is a terminal user, a user agent or a further SIP access gateway.

In some embodiments, the heartbeat message is a REGISTER message or an OPTIONS message.

In the embodiments of the present disclosure, after the SIP access gateway with a simple call application processing function restarts, it will include its restart time in the replies to all the received heartbeat messages Upon the reception of the replies, the user agent, the terminal user or a further SIP access gateway re-registers according to a determination. Typically, the time intervals between heartbeat messages are short, such as 60~90 seconds. With the method, after the SIP access gateway restarts, it can re-obtain user information of all users within its coverage, so that the time period in which the voice service is lost will be greatly shortened.

It should be appreciated the description in the SUMMARY are not intended to limit essential or important features of the embodiments of the present disclosure or used to limit the scope of the present disclosure. Other features of the present disclosure will become easier to understand from the following description.

BRIEF DESCRIPTION OF THE DRAWINGS

The above and other features, advantages and aspects of various embodiments of the present disclosure will become apparent from the following detailed illustration, when taken in conjunction with the accompanying drawings in which the same or similar reference signs denote the same or similar elements, in which.

The same or similar reference numerals denote the same or similar elements throughout the figures.

DETAILED DESCRIPTION OF EMBODIMENTS

Embodiments of the present disclosure will be described in more detail with reference to the accompanying drawings, in which some embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure. It should be appreciated that the accompanying drawings and embodiments of the present disclosure are merely for the illustration purpose, rather than limiting the scope of the present disclosure.

The terms "comprise", "include" and their variants used here are to be read as open terms that mean "include, but is not limited to". The term "based on" is to be read as "based at least in part on". The term "one embodiment" is to be read as "at least one embodiment"; the term "another embodiment" is to be read as "at least one other embodiment". Definitions of other terms will be presented in description as below.

A more detailed description is presented below to the present invention with reference to the accompanying drawings.

Figure 1:
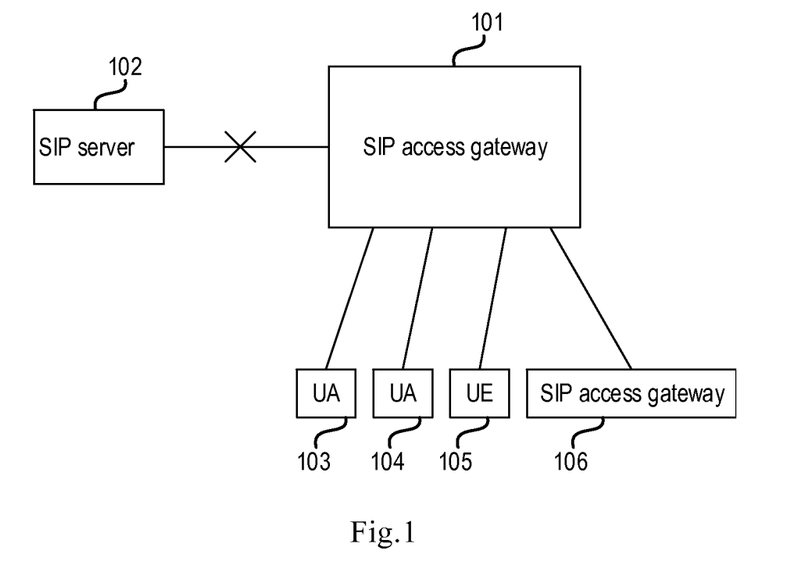
FIG. 1 shows an example network architecture in which one embodiment of the present disclosure may be implemented.

FIG. 1 shows an example network architecture in which an embodiment of the present disclosure may be implemented. In this embodiment, a SIP access gateway 101 is connected to a SIP server 102. The user agents, namely UA103 and UA104, terminal user UE105 as well as a SIP access gateway 106 access a network via the SIP access gateway 101.

As described above, when the SIP access gateway 101 is disconnected with the SIP server 102, in order to ensure users within the coverage of the SIP access gateway 101 can make "local" calls, the SIP access gateway 101 can provide basic call service and forward SIP messages in a stateless way, that is the SIP access gateway 101 does not record states of calls. The SIP access gateway 101 may employ its own simple call application processing function to provide the basic phone call service for the user agents UA103 and UA104, the terminal user UE105 and the non-enhanced SIP access gateway 106 within the local network. The SIP access gateway 101 does not configure user information in advance, and obtains and saves user information only by registration learning, that is, user registration.

It should be appreciated that the type and number of devices and/or elements shown in FIG. 1 are merely for the illustration purpose and not limiting. Generally, the network architecture may comprise a device such as a gateway, which is not shown in FIG. 1 for the simplicity.

Figure 2:
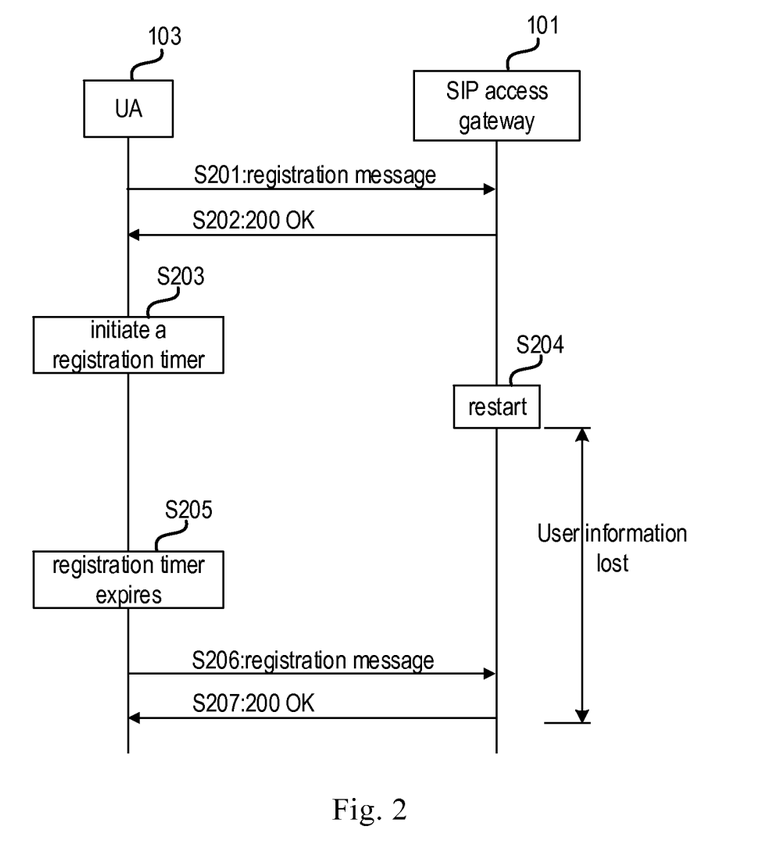
FIG. 2 shows a schematic diagram of the process of restart of a SIP access gateway in the prior art.

FIG. 2 shows a schematic diagram of the process of restart of a SIP access gateway in the prior art. The process will be described in detail with reference to FIG. 1. In this embodiment, the communication between the SIP access gateway 101 and the SIP server 102 breaks down.

First, the user agent UA103 sends (S201) to the SIP access gateway 101 a registration message, such as a REGISTER message, which includes user information of a user represented by the user agent UA103. When the user agent UA103 represents multiple users, the user agent UA103 will send multiple registration messages to the SIP access gateway 101.

Upon reception of the above registration message, the SIP access gateway 101 saves the above user information. Subsequently, the SIP access gateway 101 sends (S202) 200 OK to the user agent UA103. Upon receipt of the reply message of 200 OK, the user agent UA103 initiates (S203) a registration timer.

Later at a time point, the SIP access gateway 101 restarts (S203) due to some reasons. After the SIP access gateway 101 restarts, it loses all user information saved thereon. At this point, many users will not receive calls due to loss of user information.

After a registration timer of the user agent UA103 expires (S205), the user agent UA103 re-registers with the SIP access gateway 101, that is, the user agent UA103 sends (S206) to the SIP access gateway 101 one or more registration messages, such as REGISTER messages for example. The registration messages include user information of a user represented by the user agent UA103. Upon reception of the user information, the SIP access gateway 101 will save the user information. After all user agents within the coverage of the SIP access gateway 101 complete re-registration, all user information on the SIP access gateway 101 is restored, and users within the coverage of the SIP access gateway 101 may restore "local" communication.

It can be seen that in the prior art, given the communication between the SIP access gateway 101 and the SIP server 102 breaking down, if the SIP access gateway 101 restarts, in a time period between the restart of the SIP access gateway 101 and the completion of user agent re-registration, many users within the coverage of the SIP access gateway 101 will not receive calls due to loss of user information. This is exactly the problem to be solved by the present disclosure.

Figure 3:
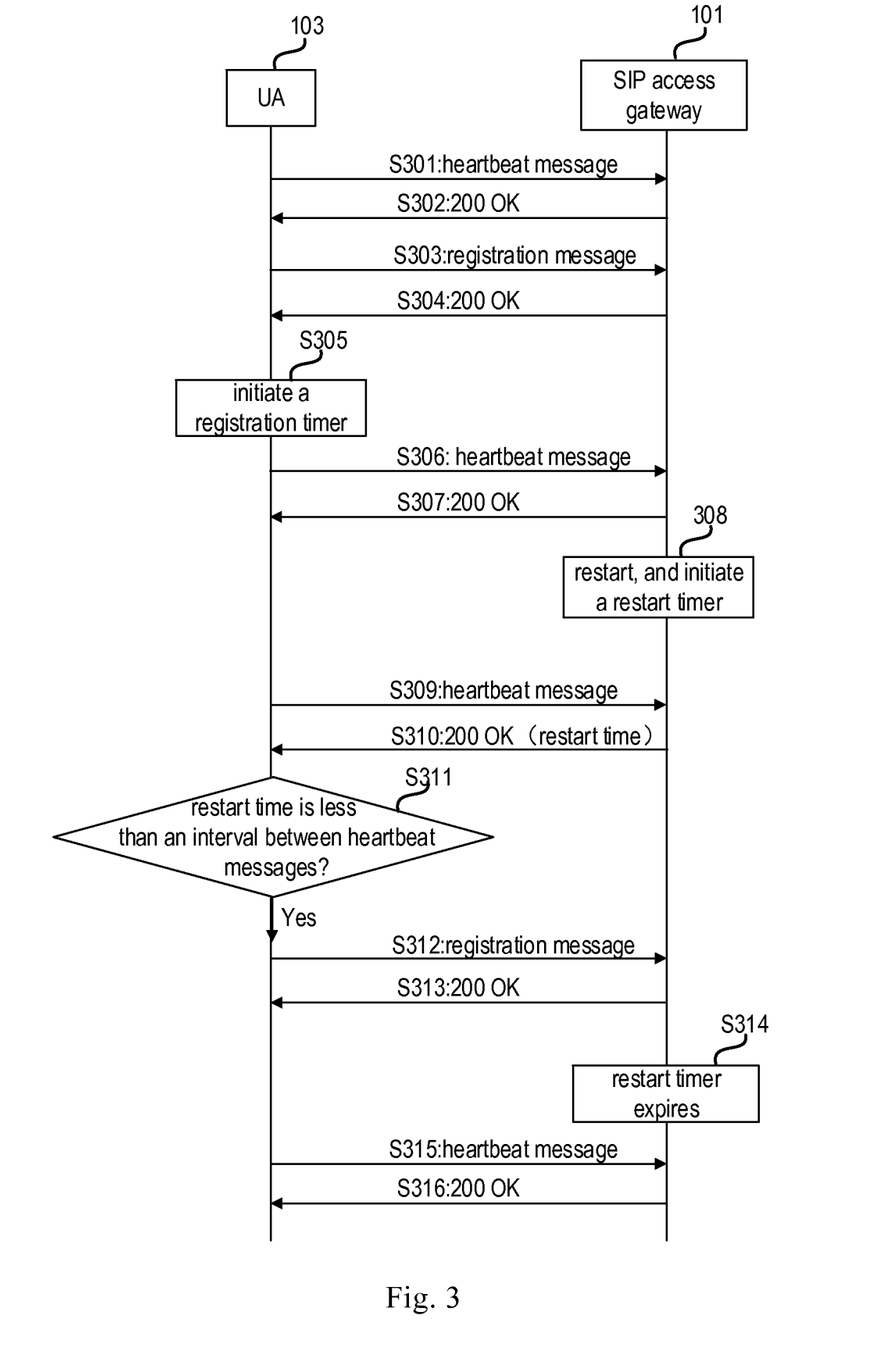
FIG. 3 shows a schematic diagram of the process for managing user information according to one embodiment of the present disclosure.

FIG. 3 shows a schematic diagram of the process for managing user information according to one embodiment of the disclosure. The process will be described in detail with reference to FIG. 1.

In the SIP network, a network element connected to the SIP access gateway periodically sends to the SIP access gateway a heartbeat message for monitoring whether the communication between the user agent and the SIP access gateway is normal. As shown in FIG. 3, the user agent UA103 sends (S301) a heartbeat message to the SIP access gateway 101, and the heartbeat message is a REGISTER message or an OPTIONS message. Upon the reception of the message, the SIP access gateway 101 sends (S302) a reply message of 200 OK to the user agent UA103.

The user agent UA103 sends (S303) to the SIP access gateway 101 a registration message, such as a REGISTER message for example, which includes user information of a user represented by the user agent UA103. When the user agent UA103 represents multiple users, the user agent UA103 will send multiple registration messages to the SIP access gateway 101. The SIP access gateway 101, upon reception of the user information, saves the user information and then sends 200 OK to the user agent UA103. Upon receipt of the 200 OK, the user agent UA103 initiates (S305) a registration timer.

When the time interval between heartbeat messages is reached, the user agent UA103 will re-send (S306) a heartbeat message to the SIP access gateway 101, and the heartbeat message is a REGISTER message or an OPTIONS message. Upon reception of the heartbeat message, the SIP access gateway 101 sends (S307) a reply message of 200 OK to the user agent UA103.

The SIP access gateway 101 restarts (S308) due to some reasons, and in the meanwhile initiates (S309) a restart timer.

After the SIP access gateway 101 restarts, when the time interval between heartbeat messages is reached again, the user agent UA103 will re-send (S309) a heartbeat message to the SIP access gateway 101. The heartbeat message is a REGISTER or an OPTIONS message. Upon receipt of the message, the SIP access gateway 101 sends (S310) the reply message of 200 OK to the user agent UA103, and the reply message includes the time when the SIP access gateway 101 restarts. The restart time may be a relative time or an absolute time. For example, the restart time may be 10 minutes ago, and the restart time may be 22:05, etc.

Those skilled in the art will appreciate that the time when the SIP access gateway 101 restarts may be included in the heartbeat message in various suitable ways. For example, the time when the SIP access gateway 101 restarts may be included in a WARNING header of a SIP message.

Upon reception (S310) of the above heartbeat reply message, the user agent UA103 reads the time when the SIP access gateway 101 restarts, and determines (S311) whether a difference between the restart time and a current time is less than the time interval between heartbeat messages.

If the difference between the restart time and the current time is less than the time interval between heartbeat messages, which means user information of the user agent UA103 in the SIP access gateway 101 has been lost, the user agent UA103 will re-register. The user agent UA103 re-sends (S312) to the SIP access gateway 101 one or more registration messages, such as REGISTER messages for example, which include user information of a user represented by the user agent UA103. Upon the reception of the message, the SIP access gateway 101 saves the above user information, and then sends the 200 OK to the user agent UA103. In some embodiments, the SIP access gateway 101 cannot determine whether the registration message is used for registration or for heartbeat detection; and therefore the SIP access gateway 101 will still include in the message of 200 OK the time when the SIP access gateway 101 restarts.

After the restart timer on the SIP access gateway 101 expires (S314), the SIP access gateway 101 considers it has obtained the user information of the user agent UA103. Therefore, when a heartbeat message of the user agent UA103 is received (S315) again, the user agent UA103 does not need to re-register. Upon reception (S315) of the heartbeat message, the SIP access gateway 101 sends (S316) to the user agent UA103 a reply message of 200 OK, which no longer includes the time when the SIP access gateway 101 restarts.

It can be seen that in the present invention, the SIP access gateway 101, after the restarting, will include its restart time in replies to all received heartbeat messages. The user agent, the terminal user or a further SIP access gateway will re-register according to a determination result. Upon reception of the reply. Generally, the time intervals between heartbeat messages are relatively short, such as 60~90 seconds. With the method, after the restarting, the SIP access gateway 101 can re-obtain user information of all users within its coverage in a short time, so that the time for which voice service is lost will be significantly shortened.

Figure 4:
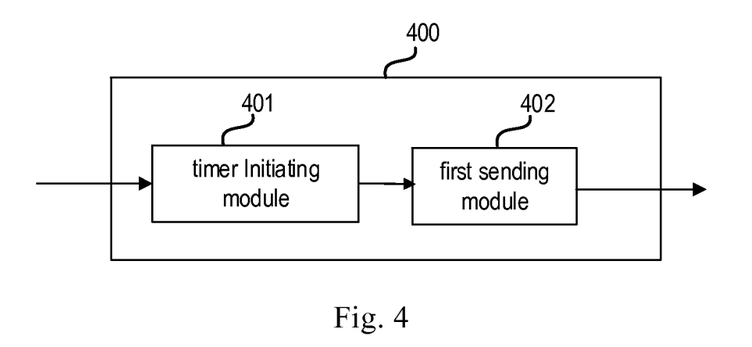
FIG. 4 shows a block diagram of an apparatus for managing user information according to one embodiment of the present disclosure.

FIG. 4 shows a block diagram of an apparatus for managing user information according to one embodiment of the present invention. It will be appreciated that the apparatus 400 may be implemented at a SIP access gateway (such as the SIP access gateway 101). The apparatus 400 comprises: timer initiating module 401 and first sending module 402.

With reference to FIGS. 1 and 3, a detailed description is presented below to the working process of the apparatus 400.

The SIP access gateway 101 restarts due to some reasons, and in the meanwhile the timer initiating module 401 initiates a restart timer.

After the SIP access gateway 101 restarts, upon the SIP access gateway 101 receiving a heartbeat message (such as REGISTER message or OPTIONS message) from some network element, the first sending module 402 sends a heartbeat reply message to the network element. The reply message includes the time when the SIP access gateway 101 restarts. The restart time may be a relative time or an absolute time. For example, the restart time may be 10 minutes ago, and the restart time may be 22:05, etc. The network element may be the user agent UA103, the user agent UA104, the terminal user UE105, or the non-enhanced SIP access gateway 106.

Those skilled in the art may appreciate that the time when the SIP access gateway 101 restarts may be included in the heartbeat reply message in various suitable ways. For example, the time may be included in a WARNING header of a SIP message.

Subsequently, Upon reception of one or more registration messages about re-registration of the network element, the SIP access gateway 101 saves user information of a user represented by the network element.

After the restart timer on the SIP access gateway 101 expires, the SIP access gateway 101 considers it has obtained user information of all users represented by the network element. Therefore, when a heartbeat message of the network element is received again, a reply message is directly sent to the network element without a need of re-registration, which means the reply message no longer includes the time when the SIP access gateway 101 restarts.

Figure 5:
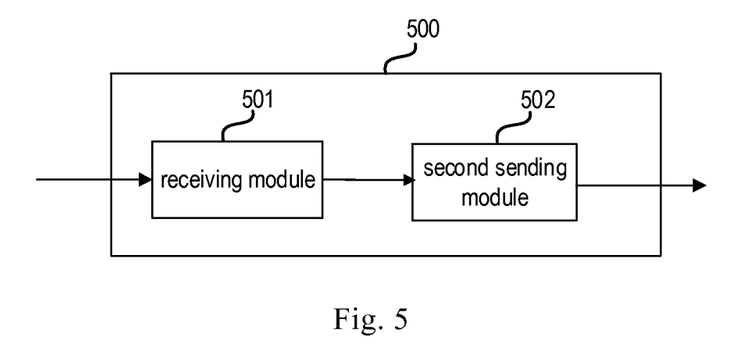
FIG. 5 shows a block diagram of an apparatus for managing user information according to another embodiment of the present disclosure.

FIG. 5 shows a block diagram of an apparatus for managing user information according to one embodiment of the present invention. It will be appreciated that the apparatus 500 may be implemented at a user agent (such as the user agent UA103 or the user agent UA104), a terminal user (the terminal user UE105) or a SIP access gateway (a further non-enhanced SIP access gateway 106). The apparatus 500 comprises: receiving module 501 and second sending module 502.

With reference to FIGS. 1 and 3, a detailed description is presented below to the working process of the apparatus 500.

First, the receiving module 501 in the user agent UA103 receives from a SIP access gateway a heartbeat reply message, such as 200 OK. The heartbeat reply message includes the time when the SIP access gateway 101 restarts.

Next, the user agent UA103 determines a difference between the restart time and a current time is less than a time interval between heartbeat messages. The heartbeat message may be a REGISTER message or an OPTIONS message. If the difference between the restart time and the current time is less than the time interval between heartbeat messages, which means user information of the user agent UA103 on the SIP access gateway 101 has been lost, the user agent UA103 will re-register on behalf of all users thereon. The second sending module 502 re-sends (S312) to the SIP access gateway 101 a registration message, such as REGISTER message. The registration message includes user information of a user represented by the user agent UA103. If the user agent UA103 represents multiple users, the second sending module 502 will send multiple registration messages to the SIP access gateway 101.

Generally, various embodiments of the present disclosure may be implemented in hardware or special purpose circuit, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other diagrammatic representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

For example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or divided between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical storage device, a magnetic storage device, or any suitable combination thereof.

Further, while operations are depicted in a particular order, it should not be appreciated as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Rather, various features that are described in the context of a single embodiment may also be implemented in multiple embodiments separately or in any suitable sub-combination.

Although the subject matter has been described in a language that is specific to structural features and/or method actions, it is to be appreciated the subject matter defined in the appended claims is not limited to the specific features or actions described above. Rather, the above-described specific features and actions are disclosed as an example of implementing the claims.

I claim:

1. A method of managing user information in a SIP access gateway, the method comprising:
   in response to the SIP access gateway restarting, initiating a restart timer at the SIP access gateway; and
   within an expiration period of the restart timer, sending a heartbeat reply message from the SIP access gateway to a network element in response to a heartbeat message from the network element, the heartbeat reply message including a time indicating when the SIP access gateway restarted.

2. The method according to claim 1, wherein the network element is a terminal user, a user agent or a further SIP access gateway.

3. The method according to claim 1, wherein the heartbeat message is a REGISTER message or an OPTIONS message.

4. The method according to claim 1, further comprising:
   within the expiration period of the restart timer, receiving the heartbeat message from the network element at the SIP access gateway.

5. The method according to claim 1, further comprising:
   receiving a registration message from the network element at the SIP access gateway to re-register the SIP access gateway after the SIP access gateway restarted, the registration message including user information of a user represented by the network element; and sending a registration reply message from the SIP access gateway to the network element in response to the registration message, the registration reply message including the time indicating when the SIP access gateway restarted.

6. A method of managing user information in a network element of a SIP network, the method comprising:

receiving a heartbeat reply message from a SIP access gateway at the network element, the heart reply message including a time indicating when the SIP access gateway restarted; and if a difference between the time when the SIP access gateway restarted and a current time is less than a time interval between heartbeat messages sent by the network element, sending a registration request from the network element to the SIP access gateway, the registration request including user information of a user represented by the network element.

7. The method according to claim 6, wherein the network element is a terminal user, a user agent or a further SIP access gateway.

8. The method according to claim 6, wherein the heartbeat message is a REGISTER message or an OPTIONS message.

9. The method according to claim 6, further comprising:
sending the heartbeat message from the network element to the SIP access gateway.

10. The method according to claim 6, further comprising:
receiving a registration reply message from the SIP access gateway at the network element, the registration reply message including the time indicating when the SIP access gateway restarted.

11. An apparatus for managing user information in a SIP access gateway, the apparatus comprising:

at least one processor; and at least one memory including computer program code;

wherein the at least one memory and the computer program code are configured to, with the at least one processor, cause the SIP access gateway to initiate a restart timer in response to the SIP access gateway restarting;

wherein the at least one memory and the computer program code are configured to, with the at least processor, within an expiration period of the restart timer, cause the SIP access gateway to send a heartbeat reply message to a network element in response to a heartbeat message from the network element, the heartbeat reply message including a time indicating when the SIP access gateway restarted.

12. The apparatus according to claim 11, wherein the network element is a terminal user, a user agent or a further SIP access gateway.

13. The apparatus according to claim 11, wherein the heartbeat message is a REGISTER message or an OPTIONS message.

14. The apparatus according to claim 11, wherein the at least one memory and the computer program code are configured to, within the expiration period of the restart timer, cause the SIP access gateway to receive the heartbeat message from the network element.

15. The apparatus according to claim 11, wherein the at least one memory and the computer program code are configured to cause the SIP access gateway to receive a registration message from the network element to re-register the SIP access gateway after the SIP access gateway restarted, the registration message including user information of a user represented by the network element;

wherein the at least one memory and the computer program code are configured to cause the SIP access gateway to send a registration reply message to the network element in response to the registration message, the registration reply message including the time indicating when the SIP access gateway restarted.

16. An apparatus of managing user information in network element of a SIP network, the apparatus comprising:

at least one processor; and at least one memory including computer program code;

wherein the at least one memory and the computer program code are configured to, with the at least one processor, cause the network element to receive a heartbeat reply message from a SIP access gateway, the heartbeat reply message including a time indicating when the SIP access gateway restarted;

wherein the at least one memory and the computer program code are configured, with the at least processor, cause the network element to send a registration request to the SIP access gateway if a difference between the time when the SIP access gateway restarted and a current time is less than a time interval between heartbeat messages sent by the network element, the registration request including user information of a user represented by the network element.

17. The apparatus according to claim 16, wherein the network element is a terminal user, a user agent or a further SIP access gateway.

18. The apparatus according to claim 16, wherein the heartbeat message is a REGISTER message or an OPTIONS message.

19. The apparatus according to claim 16, wherein the at least one memory and the computer program code are configured to, within the expiration period of the restart timer, cause the network element to send the heartbeat message to the SIP access gateway.

20. The apparatus according to claim 16, wherein the at least one memory and the computer program code are configured to cause the network element to receive a registration reply message from the SIP access gateway, the registration reply message including the time indicating when the SIP access gateway restarted.

* * * * *